United States Patent [19]

Schumann

[11] Patent Number: 4,983,290
[45] Date of Patent: Jan. 8, 1991

[54] SLIT-TUBE FILTER

[75] Inventor: Günter Schumann, Kaarst, Fed. Rep. of Germany

[73] Assignee: Hein, Lehmann AG, Dusseldorf, Fed. Rep. of Germany

[21] Appl. No.: 375,385

[22] Filed: Jun. 30, 1989

[30] Foreign Application Priority Data

Jul. 8, 1988 [DE] Fed. Rep. of Germany ....... 3823192

[51] Int. Cl.$^5$ ...................... B01D 24/46; B01D 29/23; B01D 29/64
[52] U.S. Cl. ................... 210/413; 210/497.01; 55/289; 55/296; 55/477; 209/386; 209/390
[58] Field of Search ......... 209/386, 388, 390; 55/289, 296, 477; 210/107, 408, 413, 415, 416.1, 497.01, 497.2, 498

[56] References Cited

U.S. PATENT DOCUMENTS

| 442,120 | 12/1890 | Hutchins | 55/477 |
| 738,166 | 9/1903 | Davidson | 209/390 |
| 891,424 | 6/1908 | Jessup | 209/390 |
| 1,275,299 | 8/1918 | Pellerin | 209/390 |
| 3,145,164 | 8/1964 | Jonkman | 209/388 |
| 3,246,754 | 4/1966 | Sackett | 209/390 |
| 4,214,878 | 7/1980 | Weiss | 55/296 |

Primary Examiner—Richard V. Fisher
Assistant Examiner—Wanda L. Millard
Attorney, Agent, or Firm—Herbert Dubno

[57] ABSTRACT

A slit-tube filter has a hollow cylindrical filter element of bent wires which are attached to vertical retaining supports and form horizontal slits between themselves through which the liquid to be filtered passes, the cylindrical inner wall of the filter elements forming the filter surface adjacent the flow of liquid. The liquid flows from the inside of the filter element to the outside. A stripping device passes over the filter surface adjacent the flow of liquid, and bears against the inner wall of the cylinder. The stripping device is a coaxial helix of brushes which rotates in relation to the filter element in a direction such that the suspended and settleable solids disposed on and in front of the filter surface are conveyed downwards.

6 Claims, 3 Drawing Sheets

SLIT-TUBE FILTER

FIELD OF THE INVENTION

The invention relates to a slit-tube filter having a hollow cylindrical filter element of bent wires which are attached to vertical retaining ssuport and form horizontal slits between themselves through which the liquid to be filtered passes, the cylindrical inner wall of the filter elements forming the filter surface adjacent the flow of liquid, the liquid flowing from the inside of the filter element to the outside, and a stripping device passing over the filter surface adjacent the flow of liquid.

BACKGROUND OF THE INVENTION

In cylindrical wire slit filters it is known for the liquid to flow from the inside inwardly, or from the inside outwardly, and for the cylindrical filter basket or filter insert to be rotated manually or by a motor at regular intervals (or continuously), to strip off solids which have become deposited on the outer filter surface. The stripping device has a scraper which may fill up the gaps in the filter, thereby reducing its performance.

Nor are the suspended solids contained in the liquid to be filtered reliably enough conveyed downwards if vertically disposed brushes are substituted for a scraper.

OBJECT OF THE INVENTION

It is an object of the invention so to improve a slit tube filter of the kind specified that a high cleaning performance of the filter elements is achieved using very simple means, while at the same time the suspended and settleable solids are conveyed downwards hydraulically/mechanically.

SUMMARY OF THE INVENTION

This object is attained according to the invention by the provision of a coaxial helix of brushes which so bears guidably against the cylinder in a wall and which rotates (or stands) in relation to the filter element in a direction such that the suspended and settleable solids disposed on and in front of the filter surface are mechanically (hydraulically) conveyed downwards.

The intermittently or continuously rotating brush helix very effectively cleans the cylindrical inner side of the filter element, on which the suspended and settleable solids are deposited or on which the particles are retained by the direction of flow and the narrow slits are reliably prevented from being clogged. If care is taken that the direction of rotation of the helix will convey the particles and the liquid downwards, the result is not only a high filter performance, but the sludge also collects in the lower zone, from which it can readily be removed. Such a device is very simple in construction, calls for little maintenance, is of small external dimensions and distributes the flow of liquids evenly over the total filter surface.

Particularly advantageously the helix is attached to a coaxial hollow cylinder, which is of smaller diameter than that of the filter element and rotates in relation to the filter element. Moreover, accordidng to the invention, a clearing device is attached to the bottom end of the hollow cylinder spindle and has bent arms and is mounted in a sludge-intercepting space which is situated below the hollow cylinder and adjoins the underside of the annular space between the filter element and the hollow cylinder and can be emptied at intervals by the intermittently or continuously rotating clearing device, somithin which not only gives economic continuity, but also results in environmentally harmless disposal. The spirally bent arms of the clearing device can by a suitable direction or rotation convey the sludge to the center of the intercepting space, an annular connection to the lower sludge removal opening being provided around the center of the clearing device. Very advantageously an offtake pump is attached below the removal opening. A removable sludge sump can also be connected at this place and separated by a blocking slider from the sludge intercepting space during removal.

Also according to the invention the helix is driven by motor, so that the divice can be automatically operated continuously or intermittently. A high cleaning performance and optimum brush action with adequately thorough and rapid downward conveyance of the particles is achieved by the feature that the brush unit comprises at least one helix with a high pitch or two or more nested helixes at least one of which has a high pitch.

To obtain automatic cleaning of the sets of brushes, cleaning combs are disposed in the direction of the set of brushes on the filter tube or the filter elements. This ensures reliable cleaning of the filter slits. In all cases the particles of dirt released by the cleaning process are returned to the flow of liquid and constrainedly guided hydraulically further downwards by the helical direction of flow and conveyed into the sludge intercepting space.

BRIEF DESCRIPTION OF THE DRAWING

An embodiment of the invention will now be described in greater detail, with reference to the drawing, wherein.

SPECIFIC DESCRIPTION

Attached coaxially to the cylindrical wall of a vertical cylindrical casing 1 is a cylindrical filter element 2 comprising a wire slit filter whose filter surface lies on the inside. The total filter element 2 can be in one piece or made up of a number of cylinder segments. However, it can also comprise one single filter tube. The narrow slits between the wires lie substantially horizontally, slits of 10–500$\mu$ being preferably used.

Mounted coaxially and rotatably inside the filter element 2 (which is stationary in this embodiment) is a hollow cylinder 3 which is closed on the top and bottom sides and through which a spindle 4 extends. The spindle 4 drives the hollow cylinder 3 and is driven by a motor. For this purpose the spindle 4 emerges from the top side of the casing 1.

Figure 1:
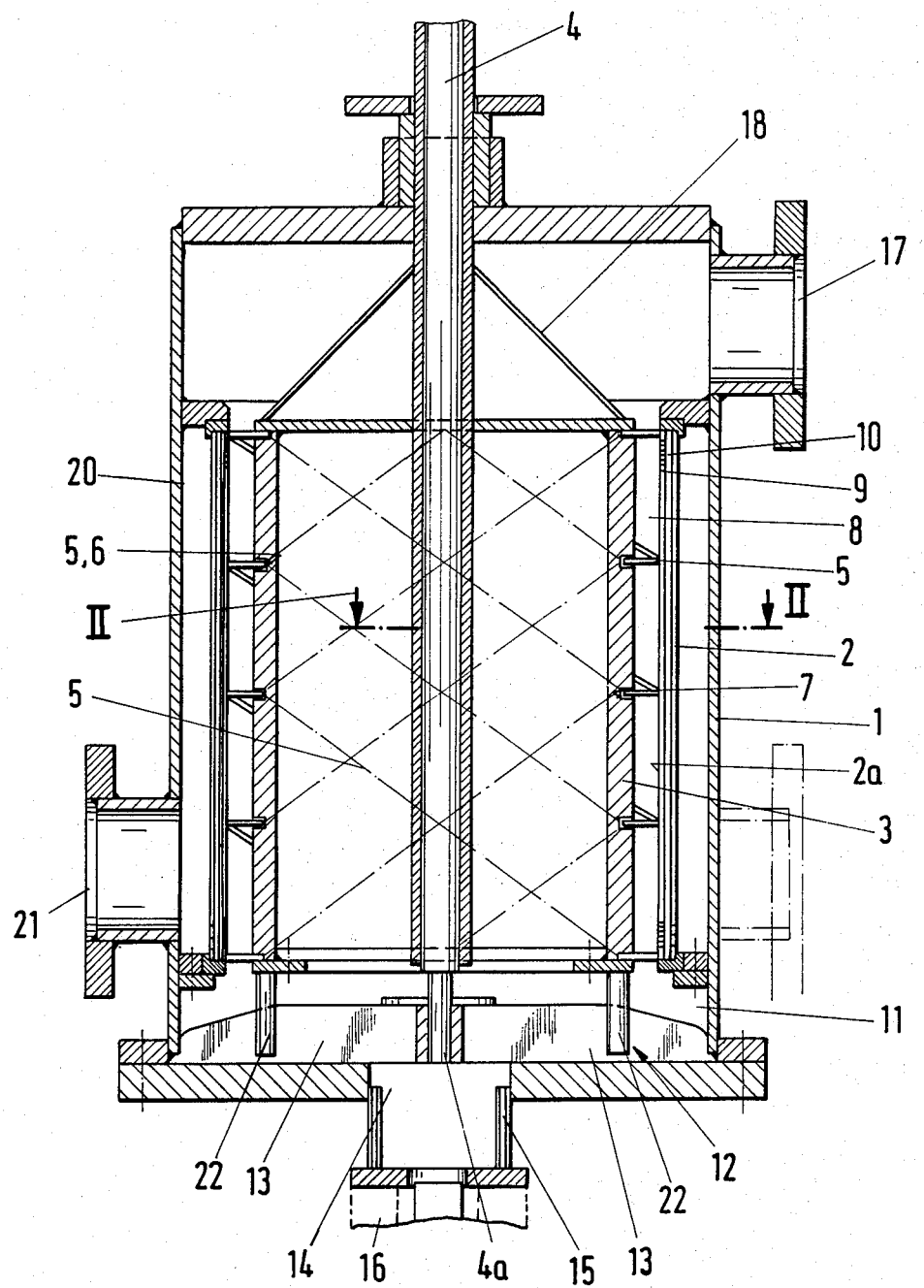
FIG. 1 is a vertical axial section through the devide.
Figure 2:
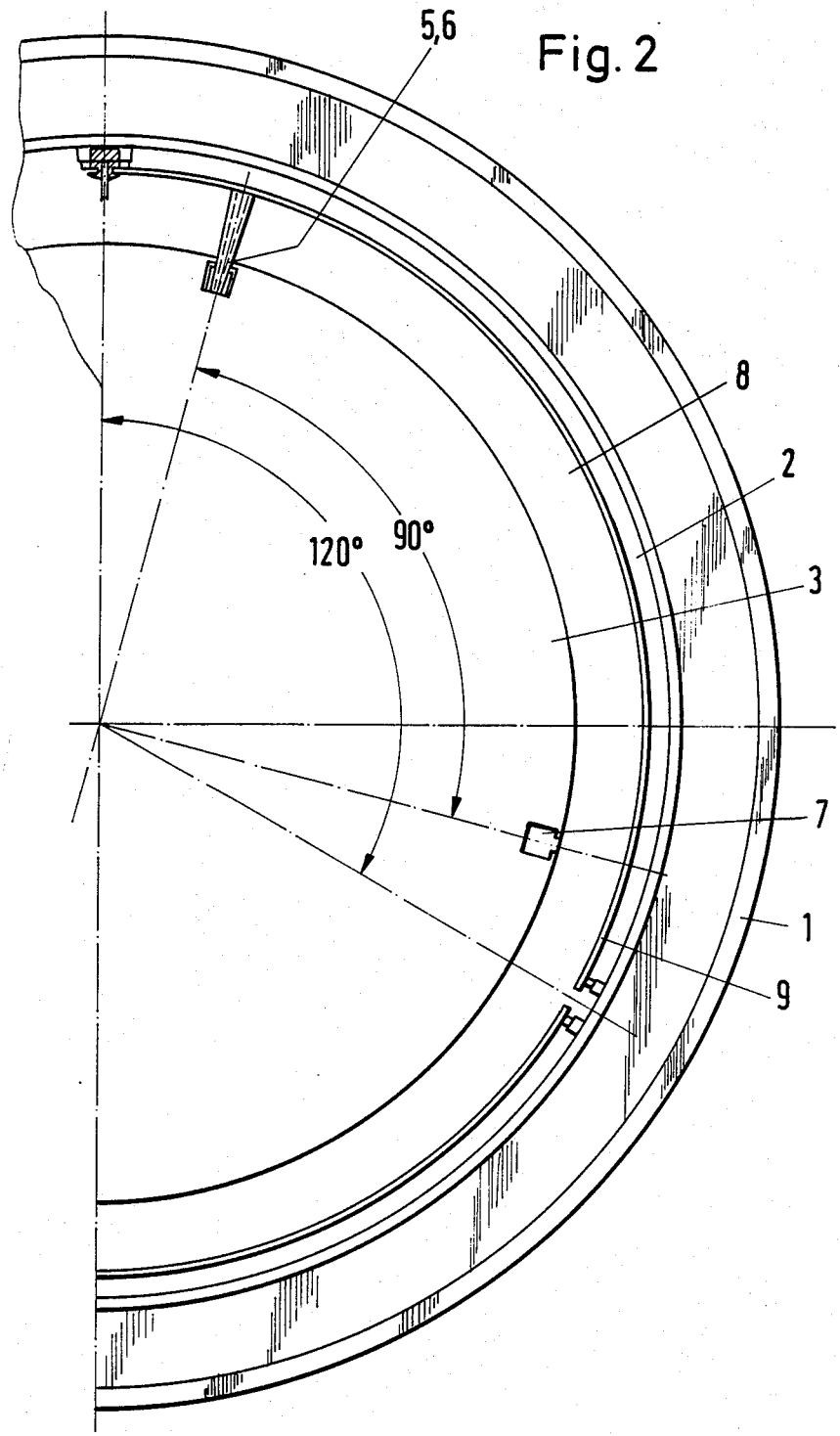
FIG. 2 is a horizontal section, taken along the line II—II of FIG. 1 ; of a detail of the device illustrated therein.

Disposed helically on the outer generated surface of the hollow cylinder 3 is a set of brushes 6 (preferably with plastic or metal bristles); in this embodiment by way of example the brush unit 5 is composed of 4 helixes of high pitch spaced at equal intervals of 90° along the periphery which extend along the outer generated surface parallel to one another and form helical annular channels between themselves (FIG. 2). The individual brushes are attached in external grooves 7 in the hollow cylinder 3.

The indidual brush helixes each bound an annular space 8 between the hollow cylinder 3 and the filter element 2. Such space being open at the top and bottom. The set of brushes 6 bears via its free end against the inner side 2a of the filter element 2 forming the top side of the filter and, due to the rotation of the hollow cylinder 3, brushes over such top side of the filter to strip off the suspended and settleable solids deposited at that place.

To give the inner side of the filter element 2 a smooth surface, the wires 9 of the filter element 2 are retained by vertical rods 10 attached to the outer side of the wires.

Figure 3:
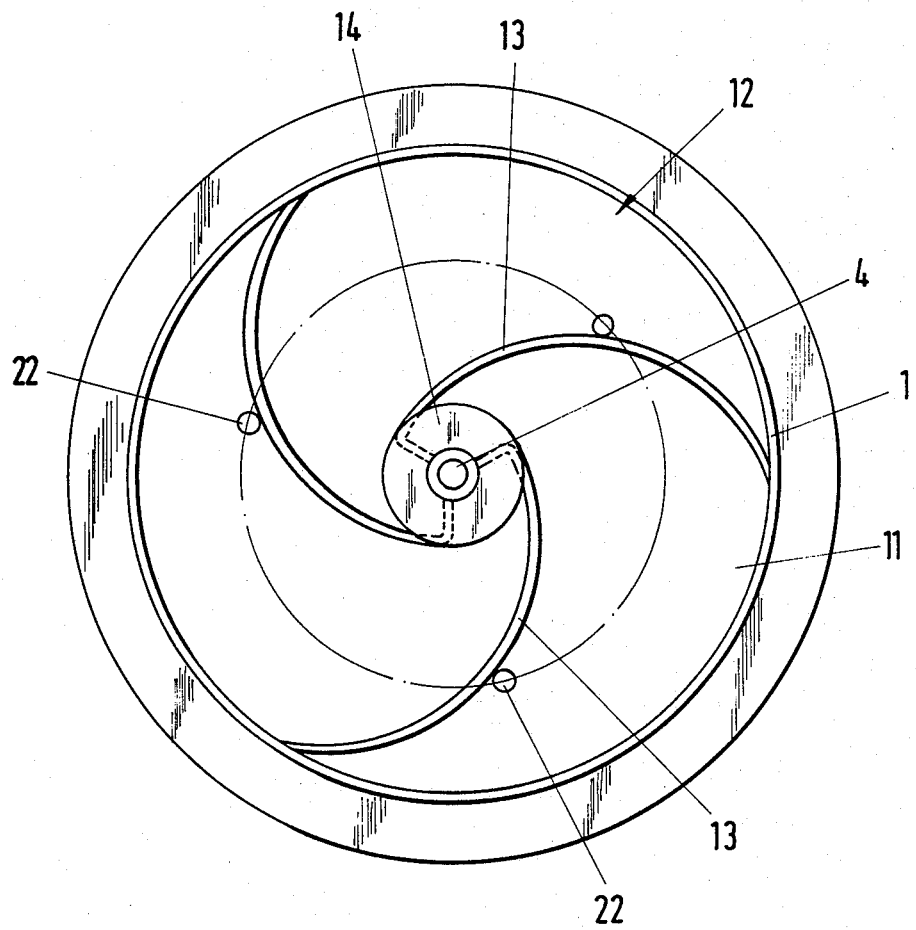
FIG. 3 is a horizontal section through the lower clearing device.

At the bottom the annular space 8 discharges into a sludge intercepting space 11 which is free from the turbulence of the liquid to be filtered and in which a clearing device 12 rotates. The clearing device 12 has arms 13 which extend from the lower, projecting centering bolt 4a of the spindle 4 spirally through the intercepting space 11 (FIG. 3). At the underside of the hollow cylinder 3 pins 22 project which act as rotation entraining members for the arms 13. The arms 13 convey the sludge to a central opening 14 in the bottom of the intercepting space 11. From the opening 14 a spigot 15 extends downwards to an offtake pump 16 or a sludge sump disposed therebelow.

The liquid to be filtered, more particularly dirty oil, is admitted through the top inlet spigot 17 of the casing 1 and is deflected by a conical plate 18 attached to the hollow cylinder 3 at the top and guided into the annular space 8. The suspended and settling solids in the liquid to be filtered are conveyed downwards into the intercepting space 11 by the set of burshes 6 and the constrainedly guided conveying flow of the liquid to be filtered. After passing through the filter element 2, the purified liquid enters an annular space 20 adjoining the filter element 2 on the outside and passes from that place to the outlet spigot 21 of the casing 1.

In one alternative the hollow cylinder is stationary and the filter element rotates. The same advantages and effects take place as those disclosed hereinbefore. In this filter system also advantageously use is made of vertical cleaning combs which project in the direction of the brush helix.

I claim:

1. A slit-tube filter comprising:
 a hollow cylindrical filter element of bent wires which are attached to vertical retaining supports and form horizontal slits between them through which a liquid to be filtered passes, a cylindrical inner wall of the filter element forming an upstream filter surface with respect to a flow of liquid through said element, the liquid flowing from an inside of the filter element to an outside thereof;
 a stripping device passing over the filter surface and including, bearing against the inner wall, a coaxial helix of brushes rotatable relative to the filter element in a direction such that suspended and settleable solids disposed on and ahead of the filter surface are conveyed downwardly, said helix being attached to a coaxial hollow cylinder of smaller diameter than said filter element and rotatable relative to the filter element;
 a spindle attached to said hollow cylinder for rotating same; and
 a clearing device attached to a bottom end of said spindle and having spirally bents arms ,said clearing device mounted in a sludge intercepting space situated below the hollow cylinder and adjoining an an underside of an annular space defined between said filter element and said hollow cylinder.

2. A slit-tube filter according to claim 1 wherein said arms of the clearing device convey sludge to a center of said intercepting space, a bottom sludge removal opening being formed at said center.

3. A slit-tube filter according to claim 2 wherein attached below the removal opening is an offtake pump so that sludge cannot contact outer sorrounding air of the filter.

4. A slit-tube filter comprising:
 a hollow cylindrical filter element of bent wires which are attached to vertical retaining supports and form horizontal slits between them through which a liquid to be filtered passes, a cylindrical inner wall of the filter element forming an upstream filter surface with respect to a flow of liquid through said element, the liquid flowing from an inside of the filter element to an outside thereof;
 a stripping device passing over the filter surface and including, bearing against the inner wall, coaxial helix of brushes rotatable relative to the filter element in a direction such that suspended and settleable solids disposed on and ahead of the filter surface are cconveyed downwardly, said helix being attached to a coaxial hollow cylinder of smaller diameter than said filter element and rotatable relative to the filter element; and
 cleaning combs positioned to automatically clean said brushes and projecting in the direction of said helix, said combs having a comb body serving for attachment and clamping of the filter elements.

5. A slit-tube filter comprising:
 an upright casing have a liquid inlet at an upper portion thereof and a liquid outlet at a lower portion thereof;
 a slit-tube cylindrical filter element disposed in said casing and having a vertical axis, said filter element defining in said casing an outer compartment along an exterior of said filter element communicating with said outlet and an inner compartment delimited by a filter surface of said element along the interior thereof and communicating with said inlet whereby liquid containing settleable solids can pass through said filter element from the inside thereof toward an outside thereof and said solids collect on said surface;
 a hollow cylinder disposed in said casing within said filter element and coaxial with said filter element to define said inner compartment therewith whereby solids in said liquid in said inner compartment settle to a bottom thereof;
 means below said bottom of said inner compartment in said casing for collecting solids settling to said bottom of said inner compartment in the form of a sludge;
 at least one helical brush mounted on said hollow cylinder and sweeping said surface of said filter element, said helical brush having a pitch and helical sense tending to displace said solids downwardly in said inner compartment upon rotation of said hollow cylinder and said brush relative to said filter element in a sense of rotation; and
 means connected with said hollow cylinder for rotating same in said senses of rotation.

6. The filter defined in claim 5 wherein a plurality of equally peripherally spaced helical brushes are formed on said hollow cylinder over an entire height of said filter element to sweep said filter element.

* * * * *